(12) United States Patent
Ohya et al.

(10) Patent No.: US 6,320,741 B1
(45) Date of Patent: Nov. 20, 2001

(54) ELECTRICAL DOUBLE LAYER CAPACITOR

(75) Inventors: Masako Ohya; Satoshi Arai, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/657,211

(22) Filed: Sep. 7, 2000

(30) Foreign Application Priority Data

Sep. 29, 1999 (JP) .................................................. 11-277562

(51) Int. Cl.[7] .............................. H01G 9/00; H01G 9/04
(52) U.S. Cl. ........................................... 361/502; 361/512
(58) Field of Search ................................ 361/502, 511, 361/512, 522

(56) References Cited

U.S. PATENT DOCUMENTS

| 6,021,039 | * | 2/2000 | Inagawa ................................ 361/502 |
| 6,046,903 | * | 4/2000 | Inagawa et al. ...................... 361/502 |
| 6,097,587 | * | 8/2000 | Inagawa et al. ...................... 361/502 |

FOREIGN PATENT DOCUMENTS

| 3-99422 | 4/1991 | (JP) . |
| 4-237109 | 8/1992 | (JP) . |
| 4-280517 | 10/1992 | (JP) . |
| 4-288361 | 10/1992 | (JP) . |
| 8-78291 | 3/1996 | (JP) . |

* cited by examiner

*Primary Examiner*—Anthony Dinkins
(74) *Attorney, Agent, or Firm*—Hayes, Soloway, Hennessey, Grossman & Hage PC (57) ABSTRACT

The present invention provides a electrical double layer capacitor that can prevent the leakage of an electrolyte solution to the outside that is caused by the fractures occurring in the collectors, and thereby both the yield during manufacture processing and the reliability can be improved. Chamfered portions 20 are formed on the corners that are the border between components that are adjacent to the surfaces 12a and 12a of the polarizing electrodes 12 that do not contact a separator 11 and a collector 13, and thereby, the stress focus on these corners, which occurs easily at the contacting portions between the polarizing electrode 12 and the collector 13, occurs with difficulty.

7 Claims, 6 Drawing Sheets

ELECTRICAL DOUBLE LAYER CAPACITOR

BACKGROUND OF THE INVENTION

1. Field of the Invention

The present invention relates to an electrical double layer capacitor, and in particular, relates to a large capacity electrical double layer capacitor using polarizing electrodes.

2. Description of the Related Art

Figure 12:
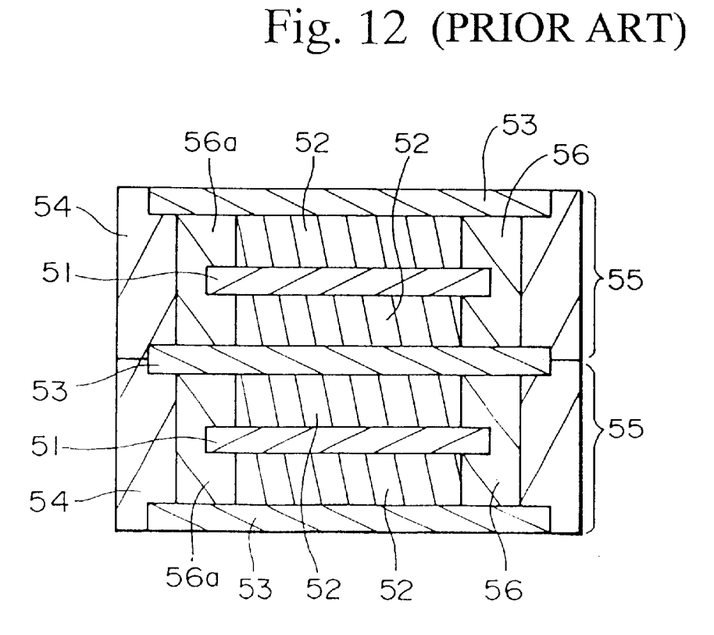
FIG. 12 is a side cross section of a conventional electrical double layer capacitor.

A conventional electrical double layer capacitor will be explained referring to FIG. 12. This electrical double layer capacitor is formed by one basic cell 55 or by two or more basic cells 55, where the basic cells 55 comprises separators 51, pairs of polarizing electrodes 52 and 52 that are disposed so as to contact respective separators 51 on both sides thereof, a pair of collectors 53 and 53 that are disposed so as to contact the surface of these polarizing electrodes 52 and 52 opposite to those of the respective separators 51, and gaskets 54 disposed in proximity to the polarizing electrodes 52 and 52 (FIG. 12 shows a two layer lamination).

The above separator 51 comprises a porous film that is non-electron conducting, and ion permeable.

The above polarizing electrodes 52 and 52 use a solid activated carbon having as a main component the activated carbon/polyacene material disclosed in Japanese Unexamined Patent Application, First Publication, No. Hei 4-288361.

The above collector 53 is a rubber or plastic that includes a conductive carbon, and during assembly, is crimped to the polarization electrode 52.

The above pair of polarization electrodes 52 and 52 face each other across the separator 51, and as a result, the collectors 53 and 53 are disposed respectively on both outside surfaces of the pair of polarizing electrodes 52 and 52. In addition, the gasket 54, which has a frame structure, is disposed so as to enclose the polarizing electrode 52, the separator 51, and the polarizing electrode 52 in a direction perpendicular to the direction of their arrangement, and thereby contact the collectors 53 and 53 on both sides so as to enclose an inner cell 56 that is filled by a hydrous (for example, sulfuric acid) or organic electrolyte solution 56a.

The gasket 54 and the collectors 53 used here can utilize a structure wherein the sizes of their external dimensions are the same, like the electrical double layer capacitor disclosed, for example, in Japanese Unexamined Patent Application, First Publication, No. Hei 4-237109 and Japanese Unexamined Patent Application, First Publication, No. Hei 4-280517, or a structure wherein the sizes of the external dimensions of the gasket are larger than those of the external dimensions of the collectors, like the electrical double layer capacitor disclosed in Japanese Unexamined Patent Application, First Publication, No. Hei 8-78291.

Because the withstanding voltage of the two layered electric capacitor is limited by the electrolytic voltage of the electrolytic solution 56a, depending on the required withstanding voltage, the electrical double layer capacitor can be formed by layering in plurality the basic cells 55 and connecting them serially. Furthermore, in order to reduce the resistance to adhesion, pressure is applied between the terminal electrodes disposed on both sides of the layered basic cells 55, 55, . . . , and additionally, a pressure plate is applied to both sides of a terminal electrode, and thereby the basic cells 55, 55, . . . , are retained by a constant pressure.

Recently, new uses have been being discovered and tested for the above two layered electric capacitor due to increasing capacity and decreasing equalizing serial resistance (ESR) by using polarizing electrodes 52. Examples are use in combination with a lead battery to form a starter motor drive power source for an automobile, and use in combination with a solar battery as a supplementary power source.

However, this type of electrical double layer capacitor has the problem that while pressure is applied in order to reduce the resistance to adhesion, at the same time, fractures occur in the collectors due to the force received from the polarizing electrodes and gaskets, and the inner cell is exposed to the outside via these fractures, and the electrolyte solution leaks to the outside.

In contrast, while the technological conception is different, in Japanese Unexamined Patent Application, First Publication, No. Hei 3-99422, a electrical double layer capacitor is disclosed in which a solid polarizing electrode is chamfered at the end facing the separator, and thus does not damage the separator.

SUMMARY OF THE INVENTION

Therefore, it is an object of the present invention to provide a electrical double layer capacitor that can improve production yields and improve reliability by preventing the disadvantage wherein electrolyte solution is discharged to the outside due to fractures caused by the collectors.

In order to attain the above object, according to a first aspect of the invention, a electrical double layer capacitor provides one basic cell or two or more layers of basic cells, the basic cells providing separators, pairs of polarizing electrodes that are disposed so as to contact the respective separators on both sides thereof, a pair of collectors positioned so as to contact the surface of these polarizing electrodes opposite to those of the respective separators, and gaskets disposed in proximity to the polarizing electrodes, and wherein chamfered portions are formed on at least one among the corner that is a border between components adjacent to the surface of said polarizing electrodes that does not contact the separator or the collector, and the corner that is the border between the surface of the polarizing electrode that contacts the collector and the surface of the separator and the collector that is adjacent to the surface.

Thereby, because chamfered portions are formed on at least one of either the corner that is the border between the components adjacent to the surface of the polarizing electrode that do not contact the separator and the collector or the corner that is the border of the surface of the polarizing electrode that contacts the collector and the surface that does not contact the separator and collector adjacent to this surface, the stress focus on these corners, where a stress focus easily occurs at the contacting portions between the collector and the polarizing electrode, occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

According to a second aspect of the invention, in a electrical double layer capacitor according to the first aspect, chamfered portions are formed on the corners that are the border between components adjacent to the surface of the gasket that faces the polarizing electrodes.

Thereby, because chamfered portions are formed on the corners that are the border between components adjacent to the surface of the gasket facing the polarizing electrode, the stress focus at the corners, where a stress focus easily occurs between the contacting portions of the collector and the gasket, occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

According to a third aspect of the invention, in a electrical double layer capacitor according to the first and second aspects, projections that position the polarizing electrode with respect to the gasket are formed on at least one of the gasket and the polarizing electrode.

Thereby, since the polarizing electrodes are positioned by the projections that position the polarizing electrodes with respect to the gasket being formed on the gasket, as a result, in the case that the polarizing electrodes and the gasket are too close, stress focus produced at the contacting portions at their borders with the collector occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

Furthermore, equalized serial resistance (ESR) caused by the applied pressure increasing irregularly when the polarizing electrodes are misaligned can be suppressed.

Furthermore, the self-discharge characteristics (SD) do not deteriorate due to the powder from the polarizing electrodes dispersing into the separator and generating a flow of current when the polarizing electrodes are misaligned with each other.

According to a fourth aspect of the present invention, a electrical double layer capacitor provides one basic cell or two or more layers of basic cells, the basic cells comprising separators, pairs of polarizing electrodes that are disposed so as to contact the respective separators on both sides thereof a pair of collectors positioned so as to contact the surface of these polarizing electrodes opposite to those of the respective separators, and gaskets disposed in proximity to the polarizing electrodes, and wherein chamfered portions are formed on the corners that are the border between components adjacent to the surface of the gasket that faces said polarizing electrode.

Thereby, because chamfered portions are formed on the corners that are borders between components adjacent to the surface of the gasket facing the polarizing electrodes, a stress focus, which occurs easily at the contacting portions between the collector and the gasket, occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

According to a fifth aspect of the invention, in a two layered electric capacitor according to the fourth aspect, projections that position the polarizing electrode with respect to the gasket are formed on at least one of the gasket and the polarizing electrode.

Thereby, because projections that position the polarizing electrode with respect to the gasket are formed on at least one of the gasket and polarizing electrode, the polarizing electrode is positioned, and as a result, in the case that the polarizing electrode and the gasket are too close, the stress focus that occurs at the contacting portions at their bordering portions in the collectors occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

Furthermore, equalized serial resistance (ESR) caused by the applied pressure increasing irregularly when the polarizing electrodes are misaligned can be suppressed.

Furthermore, the self-discharge characteristics (SD) do not deteriorate due to the powder from the polarizing electrodes dispersing into the separator and generating a flow of current when the polarizing electrodes are misaligned with each other.

According to a sixth aspect of the invention, a electrical double layer capacitor provides one basic cell or two or more layers of basic cells, the basic cells comprising separators, pairs of polarizing electrodes that are disposed so as to contact the respective separators on both sides thereof, a pair of collectors positioned so as to contact the surface of these polarizing electrodes opposite to those of the respective separators, and gaskets disposed in proximity to the polarizing electrodes, and wherein projections that position said polarizing electrode with respect to said gasket are formed on at least one of said gasket and said polarizing electrode.

Thereby, because projections that position the polarizing electrode with respect to the gasket are formed on at least one of the gasket and polarizing electrode, the polarizing electrode is positioned, and as a result, in the case that the polarizing electrode and the gasket are too close, the stress focus that occurs at the contacting portions at their bordering portions in the collectors occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

Furthermore, equalized serial resistance (ESR) caused by the applied pressure increasing irregularly when the polarizing electrodes are misaligned can be suppressed.

Furthermore, the self-discharge characteristics (SD) do not deteriorate due to the powder from the polarizing electrodes dispersing into the separator and generating a flow of current when the polarizing electrodes are misaligned with each other.

FIRST EMBODIMENTS

First Embodiment

First, the first embodiment of the present invention will be explained with reference to the figures.

Figure 1:
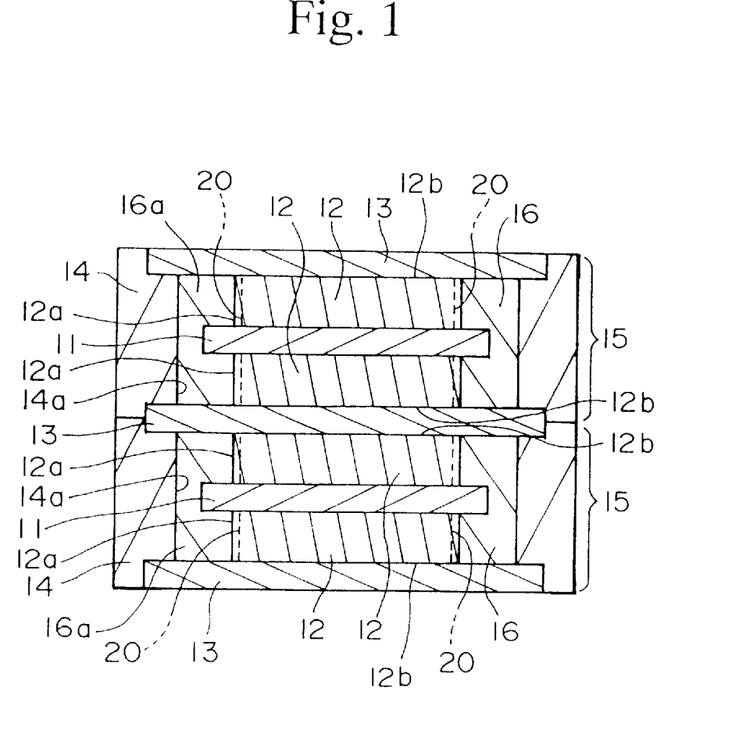
FIG. 1 is a partial cross-sectional drawing of the first embodiment of the electrical double layer capacitor according to the present invention.

As shown in FIG. 1, the electrical double layer capacitor according to the first embodiment is formed by one basic cell 15, or structured by layering this basic cell 15 in two or more layers, wherein the basic cells comprise separators 11, pairs of polarizing electrodes 12 and 12 that are disposed so as to contact the separators 11 respectively on both sides thereof, a pair of collectors 13 and 13 disposed so as to contact the respective surfaces 12b and 12b of these polarizing electrodes 12 and 12 opposite to the separators 11, and gaskets 14 disposed in proximity to the polarizing electrodes.

The separator 11 has a rectangular sheet shape, and comprises a porous film that is non-electron conducting and ion permeable. Here, a glass fiber separator, such as that used in lead batteries, is used.

A polarizing electrode 12 has a rectangular parallelepiped shape, and as a result, components adjacent to the surfaces 12a and 12a that are not in contact with the separator 11 or the collector 13 are perpendicular. In addition, these surfaces 12a and 12a are perpendicular to the surface 12b that contacts the collector 13. The polarizing electrode 12 is a block shaped activated carbon made by mixing a binder material such as phenol resin with a powdered activated carbon and then baking the mixture. Moreover, if made from this kind of activated carbon, the binder material and production method are not limited in particular. A pair of isomorphic polarizing electrodes 12 is disposed on both sides of separator 11 in the thickness direction such that the thickness direction matches the thickness direction of the separator 11.

A collector 13 has a rectangular sheet shape, and is made from a butyl rubber sheet incorporating carbon powder and other constituents. In addition, a pair of isomorphic collectors 13 is disposed on the sides of both polarizing electrodes opposite the separator 11 so that the thickness direction conforms to the thickness direction of the polarizing electrodes. Collectors 13 are crimped to a contacting polaring electrode 12 during assembly.

Figure 2:
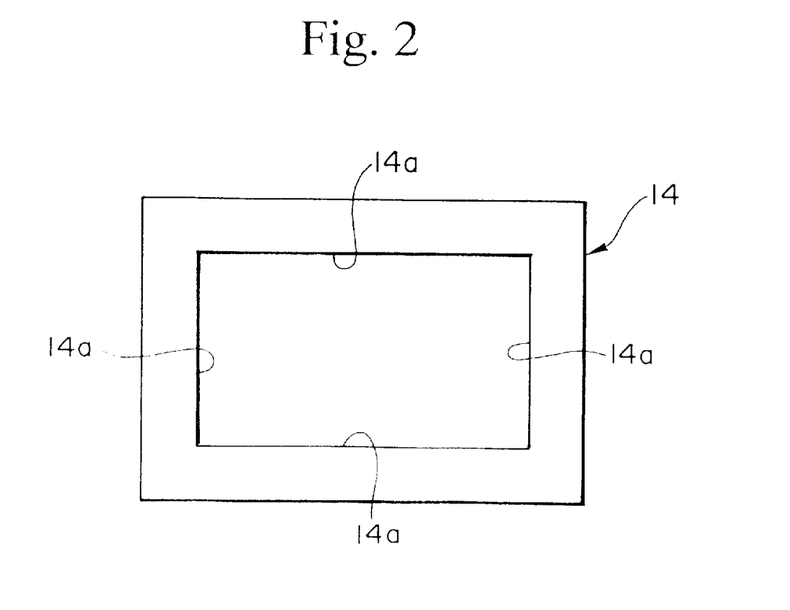
FIG. 2 is a planar drawing showing the gasket of the first embodiment of the two layer capacitor according to the present invention, the first through seventh variations of the first embodiment, and the comparative example 1.
Figure 3:
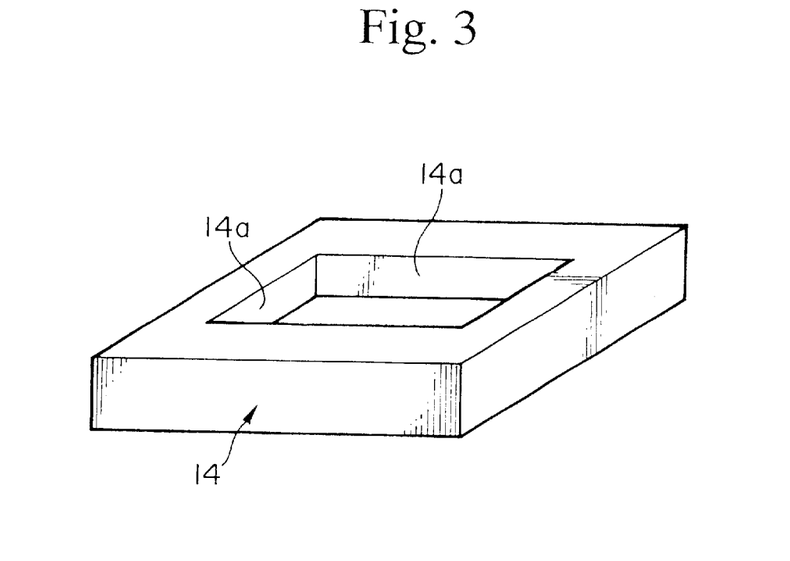
FIG. 3 is a perspective drawing showing the gasket of the first embodiment of the two layer capacitor according to the present invention, the first through seventh variations of the first embodiment, and the comparative example 1.

The gasket 14, as shown in FIG. 2 and FIG. 3, has a rectangular frame shape, and is made from an insulating material such as plastic. Here, a heat resistant ABS resin is used. In addition, the gasket 14 is disposed so as to surround completely the polarizing electrode 12, the separator 11, and the polarizing electrode 12 in a direction perpendicular to their arrangement, and with a space maintained therebetween. In this state, both opening sides connecting with the respective collectors 13 and 13, the polarizing electrode 12, the separator 11, and thereby the polarizing electrode 12 are enclosed, and the cell 16 filled with electrolyte 16a is sealed by the collectors 13 and 13. Moreover, the components adjacent to the inner surfaces 14a and 14a of the gasket 14 that face the polarizing electrodes 12 and 12 are perpendicular to each other, and no chamfered portion is formed on their corners.

The basic cells 15 having the above-described structure are arranged in a specified number of layers depending on the required withstanding voltage, and connected serially. Moreover, in the case that this type of basic cell 15 is layered in plurality, a separator 13 is shared between adjacent basic cells 15 and 15.

Figure 4:
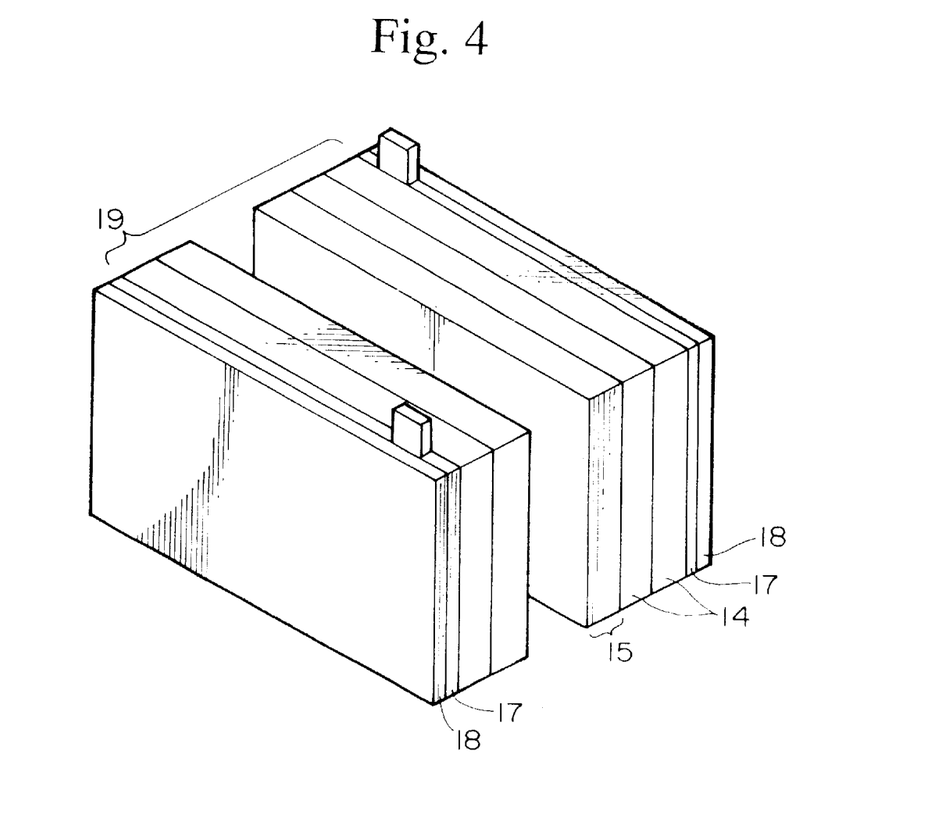
FIG. 4 is a perspective drawing showing the first embodiment of the electrical double layer capacitor according to the present invention.

As shown in FIG. 4, a terminal electrodes 17 are respectively disposed on both sides of the layered cell body 19 that is structured by layering basic cells 15, 15, . . . in this manner, and in order to reduce resistance to adhesion, pressure is applied between these terminal electrodes 17 and 17, and further pressure plates 18 are respectively disposed on both sides of these terminal electrodes 17 and 17, and the layered cell body 19 and the terminal electrodes 17 and 17 are held at a constant pressure by the pressure plates 18 and 18.

Figure 5:
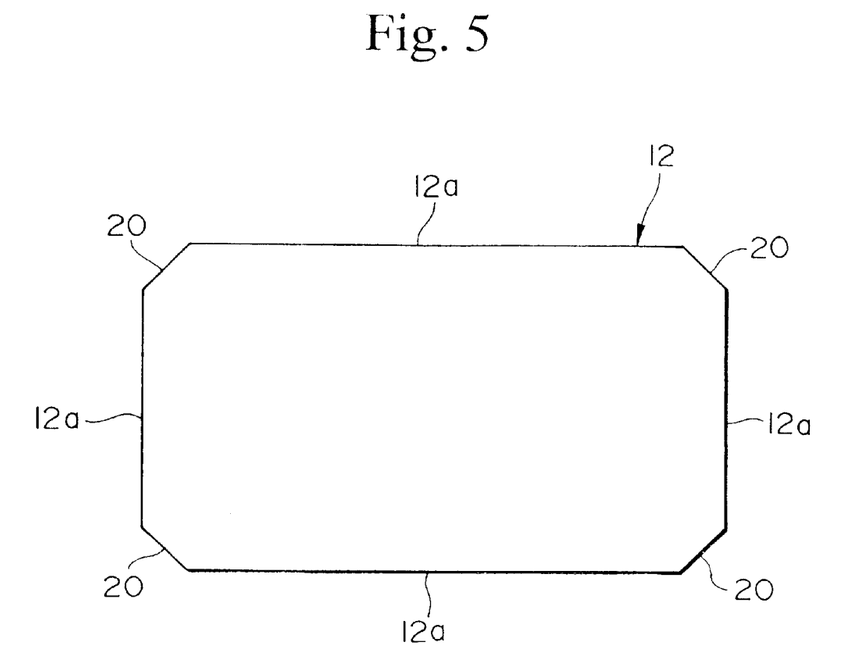
FIG. 5 is a planar drawing showing the polarizing electrodes of the first embodiment of the electrical double layer capacitor according to the present invention.

In addition, in the first embodiment, as shown in FIG. 5, on both polarizing electrodes 12 and 12, a chamfered portion 20 is formed on all corners that are borders between adjacent surfaces 12a and 12a that do not contact the respective separator 11 or collector 13, and all the chamfered portions 20, 20, . . . are formed along the entire thickness direction of the polarizing electrodes 12 and 12.

In the samples of the first embodiment, the size of a polarizing electrode 12 is 70(L)×50(W)×5(t), the size of a separator 11 is 70(L)×50(W)×0.2(t) mm, and the size of a collector 13 is 82(L)×62(W)×0.1(t) mm. In addition, the inner circumferential shape of the gasket 14 is 74(L)×5.4(W)×10.2(t) mm, and the outer circumferential shape is 90(L)×70(W)×10.2(t) mm.

Furthermore, all of the chamfered portions 20, 20, . . . of the polarizing electrodes 12 have what is termed C chamfering having a flat surface shape. The size is C=0.3, which means that the distance from the peak of a non-chamfered corner to each edge of the chamfered portion 20 is 0.3 mm.

In addition, the 18 basic cells 15, each having the separator 11, polarizing electrode 12, collector 13, and gasket 14 that have this shape, are layered serially, and a layered cell body 19 having a withstanding voltage of 15 V is produced.

Here, a dilute sulfuric acid at 30 wt % is used as an electrolyte solution 16a, and each pair of polarizing electrodes 12 and 12 in a basic cell 15 are produced by mixing, pulverizing, granulating, and baking a powdered phenol activated carbon and powdered phenol resin having a 70/30 weight ratio.

The following modifications of the above first embodiment were made. Moreover, in the following modifications, the parts that are not described are identical to those of the first embodiment.

Modification 1

Figure 6:
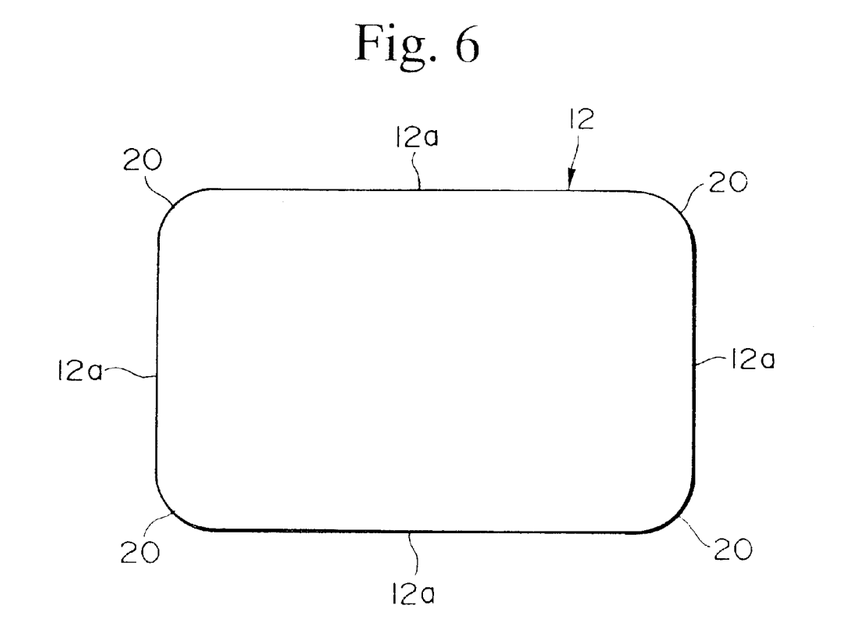
FIG. 6 is a planar drawing showing the polarizing electrodes of the modifications 1 through 7 of the first embodiment of the electrical double layer capacitor according to the present invention, the second embodiment, modification 1 of the second embodiment, the third embodiment, and the modifications 1 through 6 of the third embodiment.

As shown in FIG. 6, all of the chamfered portions 20, 20, . . . of a polarizing electrode have what is termed R chamfering, which imparts a cylindrical shape. The size is R=0.05, which means that the radius is 0.05 mm.

Modification 2

All of the chamfered portions 20, 20, . . . of a polarizing electrode have what is termed R chamfering, which imparts a cylindrical shape. The size is R=0.08, which means that the radius is 0.08 mm.

Modification 3

All of the chamfered portions 20, 20, . . . of a polarizing electrode have what is termed R chamfering, which imparts a cylindrical shape. The size is R=0.1, which means that the radius is 0.1 mm.

Modification 4

All of the chamfered portions 20, 20, . . . of a polarizing electrode have what is termed R chamfering, which imparts a cylindrical shape. The size is R=0.2, which means that the radius is 0.2 mm.

Modification 5

All of the chamfered portions 20, 20, . . . of a polarizing electrode have what is termed R chamfering, which imparts a cylindrical shape. The size is R=0.3, which means that the radius is 0.3 mm.

Modification 6

All of the chamfered portions 20, 20, . . . of a polarizing electrode have what is termed R chamfering, which imparts a cylindrical shape. The size is R=0.4, which means that the radius is 0.4 mm.

Modification 7

All of the chamfered portions 20, 20, . . . of a polarizing electrode have what is termed R chamfering, which imparts a cylindrical shape. The size is R=1.0, which means that the radius is 1.0 mm.

Second Embodiment

Next, a second embodiment of the present invention will be explained focusing on the parts that differ from those in the first embodiment. Moreover, parts that are identical to those of the first embodiment are denoted by identical reference numerals, and their explanations are omitted.

Figure 7:
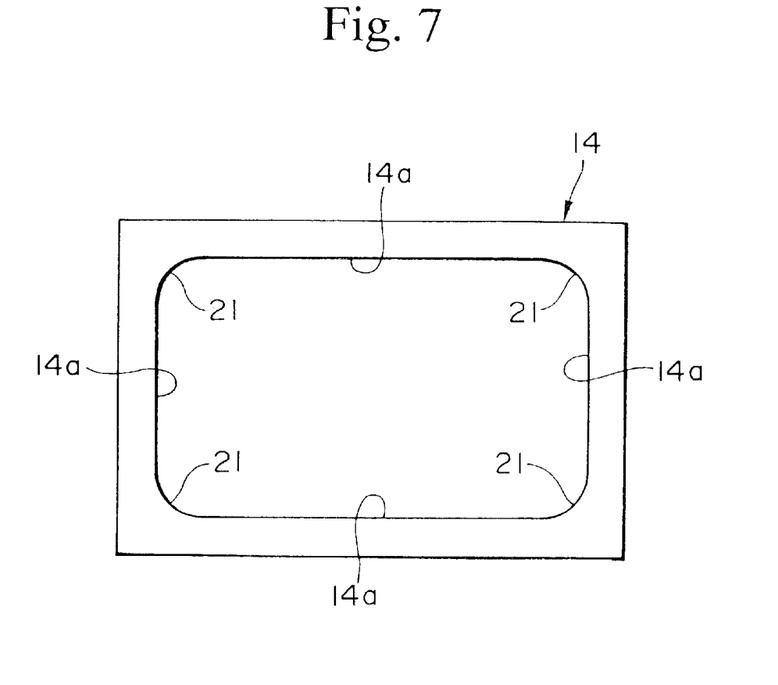
FIG. 7 is a planar drawing showing the gasket of the second embodiment of the electrical double layer capacitor according to the present embodiment.

As shown in FIG. 7, the second embodiment differs from the first embodiment on the point that a chamfered portion 21 is formed on all corners that are borders between components adjacent to the surfaces 14a and 14a of the gasket 14 facing the polarizing electrode 14. Here, all the chamfered portions 21, 21, . . . are formed extending along the entire thickness direction of the gasket 14.

All of the chamfered portions 21, 21, . . . of the gasket 14 in the samples of the second embodiment have what is termed R chamfering, which imparts a cylindrical shape. The size is R=0.3, which means that the radius is 0.3 mm.

In addition, as shown in FIG. 6, all of the chamfered portions 20, 20, . . . of the polarizing electrodes 12 in the samples of the second embodiment have what is termed R chamfering, which imparts a cylindrical shape. The size is R=0.3, which means that the radius is 0.3 mm.

The following modifications of the above second embodiment were made. Moreover, in the following modifications, the parts that are not described are identical to those of the second embodiment.

Modification 1

Figure 8:
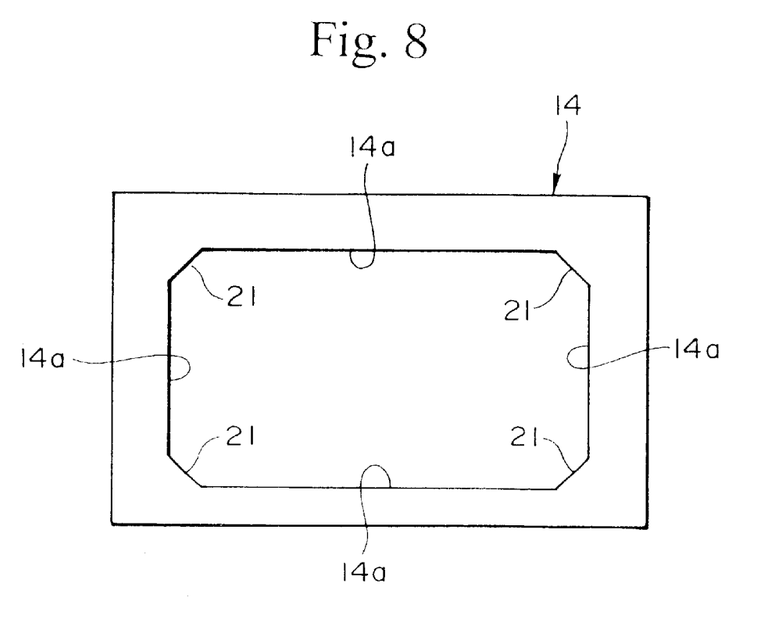
FIG. 8 is a planar drawing showing the gasket of modification 1 of the second embodiment of the electrical double layer capacitor of the present invention.

As shown in FIG. 8, all of the chamfered portions 21, 21, . . . of the gasket 14 have what is called C chamfering, which imparts a flat shape. The size is C=0.3, which means that the distance from the peak of a non-chamfered corner to each edge of the chamfered portion 21 is 0.3 mm.

Third Embodiment

Next, a third embodiment of the present invention will be explained focusing on the parts that differ from those in the first embodiment. Moreover, parts that are identical to those of the first embodiment are denoted by identical reference numerals, and their explanations are omitted.

Figure 9:
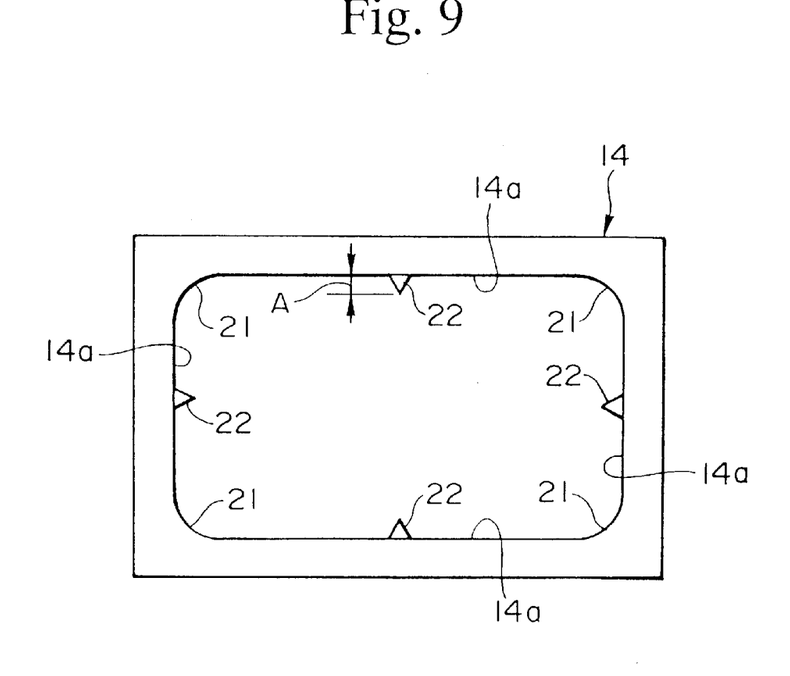
FIG. 9 is a planar drawing showing the gasket of the third embodiment of the electrical double layer capacitor according to the present invention, and modifications 1 through 5 of the third embodiment.

As shown in FIG. 9, the third embodiment differs from the first embodiment on the point that projections 22 are formed on the gasket 14 that position the polarizing electrode 12 with respect to the gasket 14 in a direction perpendicular to the direction of the arrangement of the polarizing electrode 12, the separator 11, and the polarizing electrode 12.

That is, triangular projections are formed at the center position in the respective longitudinal directions of both surfaces 14a and 14a along the longitudinal direction of the gasket 14 on the surfaces 14a and 14a on the inside of the gasket 14 facing the polarizing electrode 12 and at the center position in the respective latitudinal directions of both surfaces 14a and 14a along the latitudinal direction of the gasket 14 on the surfaces 14a and 14a of the gasket 14 that face the polarizing electrode 12, and these four projections 22, 22, . . . , project in the directions of the polarizing electrodes 12 and simultaneously abut all the pairs of polarizing electrodes 12 and 12, and position these polarizing electrodes 12 and 12 at the center positions in the longitudinal and latitudinal directions of the gasket 14.

The height A of all the projections 22, 22, . . . , of the samples of gaskets 4 in the third embodiment is 0.05 mm.

In addition, all of the chamfered portions 21, 21, . . . , of the samples of the gasket 14 in the third embodiment are what is termed R chamfered, which imparts a cylindrical shape, and the size of the radius is 0.3 mm.

Furthermore, as shown in FIG. 6, all of the chamfered portions 20, 20, . . . , of the samples of the gasket 14 in the third embodiment are what is termed R chamfered, which imparts a cylindrical shape, and the size of the radius is 0.3 mm.

The following modifications (modifications 1 through 6) were made for the above-described third embodiment. Moreover, parts other than those described in the following modifications are identical to those of the third embodiment.

Modification 1

The height A of all the projections 22, 22, . . . , of the gasket 14 is 0.1 mm.

Modification 2

The height A of all the projections 22, 22, . . . , of the gasket 14 is 0.2 mm.

Modification 3

The height A of all the projections 22, 22, . . . , of the gasket 14 is 0.1 mm.

Modification 4

The height A of all the projections 22, 22, . . . , of the gasket 14 is 0.4 mm.

Modification 5

The height A of all the projections 22, 22, . . . , of the gasket 14 is 1.0 mm.

Modification 6

Figure 10:
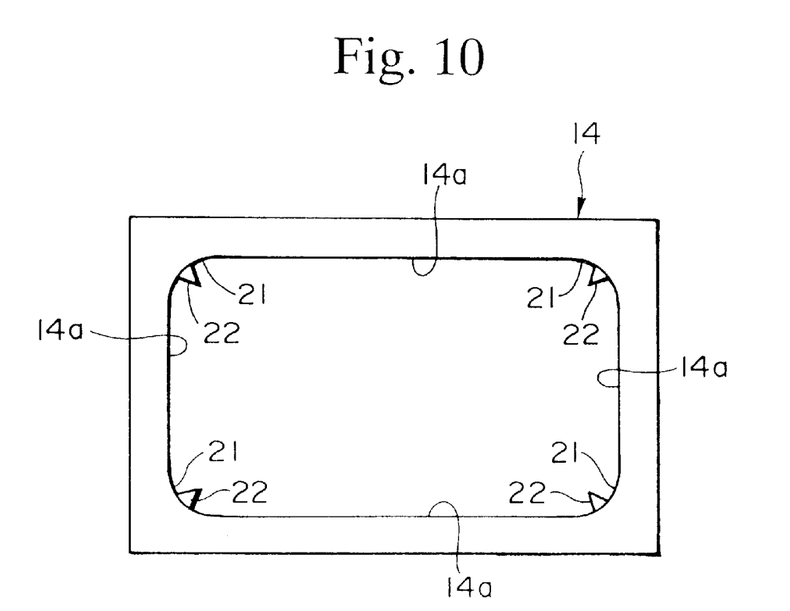
FIG. 10 is a planar drawing showing the gasket of the third embodiment of the electrical double layer capacitor of the present invention and modifications 1 through 5 of the third embodiment.

As shown in FIG. 10, the respective triangular shaped projections 22 are formed on all corners between components adjacent to the surfaces 41a and 41a of the gasket 14 facing the polarizing electrode 12, not at the respective center position of the surfaces 14a and 14a inside the gasket 14 facing the polarizing electrodes 12, these 4 projections 22 project in the direction of the respective pair of polarizing electrodes and abut simultaneously all of these polarizing electrodes 12 and 12, and the polarizing electrodes 12, and 12 are positioned at the center position in the longitudinal and latitudinal directions of the gasket 14. At this time, the height of all the projections 22, 22, . . . , of the gasket 14 is 1.0 mm.

In addition, for each of the above samples, the reliability (average service life), the product defect rate during manufacture (leakage occurrence rate), and, as initial characteristics, the equivalent serial resistance (ESR) and self-discharge characteristics (SD) were found.

Figure 11:
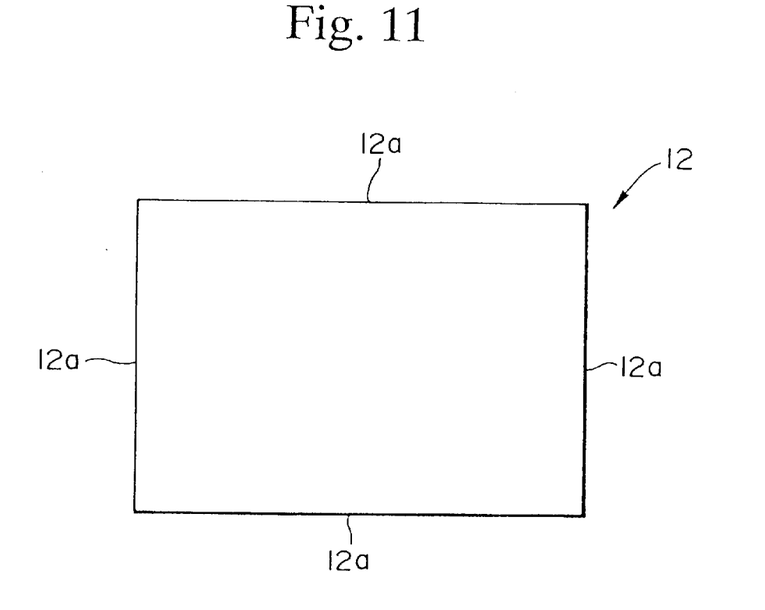
FIG. 11 is a planar drawing showing the polarizing electrode of comparative example 1 of the electrical double layer capacitor.

Here, as a "comparative example 1" for comparison with each of the examples, a sample identical to the conventional example, except that, as shown in FIG. 11, the chamfered portions are not formed on the polarizing electrode 12, and, as shown in FIG. 15, the chamfered portion on the gasket 14 and projections were not formed.

The measurement of the equivalent serial resistance (ESR) was carried out by measuring the impedance in a 1 kHz test signal frequency using the alternating current four terminal method, and calculating its real part.

The measurement of the self-discharge characteristic (SD) was calculated by applying 15 V for 24 hours at room temperature, and subsequently calculating the reduction rate×(%) of the voltage from the voltage $V_0$ at 0 hours (immediately after opening) and voltage $V_1$ after 24 hours by the following formula:

$$x=(V_0-V_1)/V_0\times 100$$

In addition, the equivalent serial resistance (ESR) and the self-discharge characteristic (SD) were both normalized to the ratio where the values of the comparison sample was 1.

The reliability test found the relative average service life after applying 15 volts for 1000 hours at 70° C. The relative average service life found the time until failure for each of the samples by this test, the Weibull distribution was plotted, and the average service life (MTTF) for each level obtained as a result was normalized to the ratio where the average life of the conventional comparative example 1 was 1.

In the leakage test, the device was placed in silicon oil at 100° C. and checked for bubbles, and the presence or absence of a leak after applying 18 V for 1 hour was confirmed. Moreover, there were 60 samples at each level, and the average was found. The following chart shows the results of the above-described tests.

| | standard | ESR | SD | leakage rate (%) | relative average service life |
|---|---|---|---|---|---|
| first embodiment | C - 0.3 | 0.89 | 0.91 | 36% | 2.9 |
| first embodiment: modification 1 | R - 0.05 | 0.90 | 0.86 | 42% | 5.3 |
| first embodiment: modification 2 | R - 0.08 | 0.89 | 0.87 | 33% | 6.1 |
| first embodiment: modification 3 | R - 0.10 | 0.91 | 0.86 | 30% | 7.8 |
| first embodiment: modification 4 | R - 0.2 | 0.91 | 0.83 | 24% | 8.1 |
| first embodiment: modification 5 | R - 0.3 | 0.93 | 0.86 | 18% | 9.3 |
| first embodiment: modification 6 | R - 0.4 | 0.89 | 0.84 | 17% | 9.6 |
| first embodiment: modification 7 | R - 1.0 | 0.90 | 0.84 | 15% | 9.5 |
| second embodiment | R - 0.3 | 0.86 | 0.81 | 13% | 9.9 |
| second embodiment: modification 1 | C - 0.3 | 0.89 | 0.75 | 15% | 9.4 |
| third embodiment | A - 0.05 | 0.72 | 0.56 | 8% | 9.0 |
| third embodiment: modification 1 | A - 0.10 | 0.67 | 0.51 | 3% | 9.4 |
| third embodiment: modification 2 | A - 0.2 | 0.65 | 0.48 | 2% | 9.8 |
| third embodiment: modification 3 | A - 0.3 | 0.64 | 0.46 | 0% | 10.3 |
| third embodiment: modification 4 | A - 0.4 | 0.65 | 0.46 | 0% | 10.8 |
| third embodiment: modification 5 | A - 1.0 | 0.66 | 0.45 | 0% | 10.5 |
| third embodiment: modification 6 | A - 1.0 | 0.67 | 0.44 | 2% | 9.9 |
| comparative example 1 | | 1 | 1 | 62% | 1 |

As is clear from the table, the ESR of above first embodiment and the modifications 1 to 7 of the first embodiment, the second embodiment and modification 1 of the second embodiment, the third embodiment and modifications 1 to 6 of the third embodiment, was favorably lowered, and smaller than that of the conventional comparative example 1. That is, when the equalized serial resistance (ESR) of the conventional example 1 is 1, the ESRs of first embodiment and the modifications 1 to 7 of the first embodiment, the second embodiment and modification 1 of the second embodiment, the third embodiment and modifications 1 to 6 of the third embodiment were in the range of 0.64 to 0.93, lower than the conventional comparative example 1.

In particular, in the third embodiment and modifications 1 to 6 of the third embodiment, the equalized serial resistance (ESR) became even significantly smaller than the first embodiment and the modifications 1 to 7 of the first embodiment, and the second embodiment and the modification 1 of the second embodiment. Specifically, the ESRs of the first embodiment and the modifications 1 to 7 of the first embodiment, and the second embodiment and the modification 1 of the second embodiment were 0.86–0.93, while in contrast, the equalized serial resistance (ESR) of the third embodiment and modifications 1 to 6 of the third embodiment were significantly smaller, at 0.64–0.72. This is because equalized serial resistance (ESR) caused by the applied pressure increasing irregularly when the polarizing electrodes 12 and 12 are misaligned can be suppressed since the polarizing electrodes 12 and 12 are positioned by projections 22 formed on the gasket for positioning the polarizing electrodes with respect to the gasket 14. Next, the self-discharge characteristics will be described.

In addition, the voltage reduction rates of the self-discharge characteristics (SD) of the first embodiment and the modifications 1 to 7 of the first embodiment, the second embodiment and modification 1 of the second embodiment, the third embodiment and modifications 1 to 6 of the third embodiment are all smaller than that of the conventional comparative examples 1. That is, where the reduction rate of the self-discharge characteristics of the conventional comparative example is 1, the first embodiment and the modifications 1 to 7 of the first embodiment, the second embodiment and modification 1 of the second embodiment, the third embodiment and modifications 1 to 6 of the third embodiment are in a range of 0.44 to 0.91, which is better than the conventional comparative example 1.

In particular, in the third embodiment and modifications 1 to 6 of the third embodiment, the voltage reduction rates of the self-discharge characteristics are even more significantly smaller than the voltage reduction rates of the self-discharge characteristics (SD) of the first embodiment and the modifications 1 to 7 of the first embodiment, the second embodiment and modification 1 of the second embodiment. Specifically, the self-discharge rates of the voltage reduction rates of the self-discharge characteristics (SD) of the first embodiment and the modifications 1 to 7 of the first embodiment, the second embodiment and modification 1 of the second embodiment were 0.75 to 0.91, while in contrast, the self-discharge rates of the voltage reduction rates of the self-discharge characteristics (SD) of the third embodiment and modifications 1 to 6 of the third embodiment are significantly reduced, at 0.44 to 0.56. This means that the voltage retention rate became high. This is because the self-discharge characteristics (SD), which deteriorate due to the powder from the polarizing electrodes 12 and 12 dispersing into the separator 11 and generate a flow of current when the polarizing electrodes 12 and 12 are misaligned, can be improved because the polarizing electrodes 12 and 12 are positioned by projections 22 formed on the gasket for positioning the polarizing electrodes with respect to the gasket 14.

Furthermore, the leakage occurrence rates of all of the first embodiment and the modifications 1 to 7 of the first embodiment, the second embodiment and modification 1 of the second embodiment, the third embodiment and modifications 1 to 6 of the third embodiment were lower than that of the conventional comparative example 1, and the relative average service life is improved. That is, the leakage occurrence rates of all of the first embodiment and the modifications 1 to 7 of the first embodiment, the second embodiment and modification 1 of the second embodiment, the third embodiment, and modifications 1 to 6 of the third embodiment were 0 to 42%, which is lower than the 62% of the conventional comparative examples. In addition, where the relative average service life of the conventional comparative example is 1, their relative average service life was 2.9–10.8. This is because stress concentrated on the corner, which occurs easily at the contacting portions between the collectors 13 and the polarizing electrodes 12, now occurs with difficulty because chamfering part 20 is formed on the corner that borders the components adjacent to the faces 12a and 12a of the polarizing electrodes 12 and 12 that do not contact the separator 11 and the collector 13. As a result, since the occurrence of fractures in the collector 13 can be prevented, the drawback of electrolytic solution 16a leaking to the outside caused by fractures occurring in the collector 13 can be prevented, and the yield during manufacturing and reliability can be improved.

In particular, as shown in modifications 5 to 7 of the first embodiment, when what is termed an R chamfer, providing a cylindrical shape, is imparted to the chamfered portion 20 of the polarizing electrode 12 having a radius equal to or greater than 0.3 mm, because the leakage occurrence rate is significantly decreased and the relative average service life in increased, this is more preferable. That is, in modifications 5 to 7 of the first embodiment, a leakage occurrence rate of 15–18% is a significant reduction in comparison to the 24–42% of the first embodiment and the other modifications 1 to 4 of the first embodiment. In addition, the modifications 5 to 7 of the first embodiment have a relative average service life of 9.3–9.6, which is a significant reduction in comparison to the 2.9–8.1 of the first embodiment and the other modifications 1 to 7 of the first embodiment.

In addition, the second embodiment and the modification 1 of the second embodiment have a leakage occurrence rate equal to or less than the first embodiment and the modifications 1 to 7 of the first embodiment. That is, the second embodiment and the modification 1 of the second embodiment have a leakage occurrence rate of 13 to 15%, which is equal to or less than the leakage occurrence rate of 15–42% of the first embodiment and the modifications 1 to 7 of the first embodiment. As a result, even if chamfered portion 21 of the gasket 14 and the chamfered portion 20 of the polarizing electrode 21 are not formed, the leakage occurrence rate can be inferred to be improved over the conventional comparative example 1. Furthermore, forming a chamfered portion 21 on the gasket 14 and forming a chamfered portion 20 on the polarizing electrode 12 as well is clearly preferred.

In addition, comparing the second embodiment and the modification 1 of the second embodiment, imparting a cylindrical shape to the chamfered portion 21 of the gasket 14 is clearly preferable because the leakage occurrence rate is lower than, and the relative average service life is improved over, the flat shape. That is, the second embodiment has a leakage occurrence rate of 13%, which is lower than the modification 1 of the second embodiment at 15%, and in addition, the second embodiment has a relative average service life of 9.9, which is improved over the 9.4 of the modification 1 of the second embodiment.

Moreover, in the case that a cylindrical shape is imparted to the chamfered portion 21 of the gasket 14 and the chamfered portion 20 of the polarizing electrodes 12, preferably the radius of the chamfered portion 21 of the gasket 14 is smaller than the radius of the chamfered portion 20 of the polarizing electrode 12.

In addition the third embodiment and the modifications 1 to 6 of the third embodiment all have a leakage occurrence rate significantly lower than the first embodiment and the modifications 1 to 7 of the first embodiment, and the second embodiment and modification 1 of the second embodiment. That is, the third embodiment and modifications 1 to 6 of the third embodiment have a leakage occurrence rate of 0–8%, lower than all those of the first embodiment and the modifications 1 to 7 of the first embodiment, and the second embodiment and modification 1 of the second embodiment, which were at 13 to 42%. This is because the polarizing electrodes 12 are positioned due to the projections 22 that position the polarizing electrodes 12 with respect to the gasket 14 being formed on the gasket, and as a result, in the case that the polarizing electrodes 12 and the gasket 14 are too close, the stress focus produced at the contacting portions at their borders with the collector 13 occurs with difficulty.

In addition, comparing the modification 5 of the third embodiment with modification 6 of the same, the projections 22 are provided at the center position of the surface 14a on the inside of the gasket 14, but providing projections 22 at the corners of the borders of the surfaces 14a and 14a of the gasket 14, is clearly more preferable from the viewpoint of lowering the leakage occurrence rate and improving the relative average service life. That is, the modification 5 of the third embodiment has a leakage occurrence rate of 0%, which is lower than the 2% rate of the modification 6 of the third embodiment, and in addition, the modification 5 of the third embodiment has a relative average service life of 10.5, which is an improvement over the 9.9 of the modification 6 of the third embodiment.

In addition, comparing the third embodiment to modifications 1 and 2 and modifications 3 to 5 thereof, the height of the projections 22 is equal to or greater than 0.3 mm, and clearly this is preferable from the point of view of decreasing the leakage occurrence rate and improving the relative average service life. That is, modifications 3 to 5 of the third embodiment have a leakage occurrence rate of 0%, which is lower than modifications 1 to 2 of the third embodiment at 2–8%, and in addition, modifications 3 to 5 of the third embodiment have a relative average service life of 10.3 to 10.8, which is an improvement over the third embodiment and the modifications 1 and 2 thereof, at 9.0 to 9.8.

To summarize the above, either forming chamfered portions 20 on a polarizing electrode 12, forming chamfered portions 21 on the gasket 14, or forming projections 22 on the gasket 14 produces effects that are not found conventionally. In addition, combining the formation of chamfered portions 20 on a polarizing electrode 12 and the formation of chamfered portions 21 on a gasket 14, and combining the formation of chamfered portions 20 on a polarizing electrode 12 and the formation of projections 22 on a gasket 14, or combining the formation of chamfered portions 21 on the gasket 14 and the formation of projections 22 on the gasket 14 are preferable. Combining the formation chamfered portions 20 on a polarizing electrode 12, the formation of chamfered portions 21 on a gasket 14, and the formation of projections 22 on the gasket 14 is most preferable.

In addition, the chamfered portions 20 on the polarizing electrode 12 having a cylindrical form with a radius equal to or greater than 0.3 mm is clearly preferable.

Furthermore, the chamfered portions 21 of the gasket 14 having a cylindrical shape is clearly preferable.

In addition, the projections 22 being provided at the center positions of the surfaces 14a of the gasket 14 are clearly preferable.

In addition, the height of the projections 22 being equal to or greater than 0.3 mm is clearly preferable.

Furthermore, the radius of the cylindrical chamfered portions 21 of a gasket 14 are preferably smaller than the radius of the chamfered portions 20 of a polarizing electrode 12.

Moreover, even if flat or cylindrical chamfered portions are formed on all corners that form the border between the surface 12b of the polarizing electrode 12 contacting the collector 13 and the surfaces 12a and 12a that are not in contact with the separator 11 or the collector 13 that are adjacent to the surface 12b, because stress concentrated on the corner, which occurs easily at the contacting portions between the collectors 13 and the polarizing electrodes 12, now occurs with difficulty, the same effects as those of the above-described first embodiment can be attained. Of course, chamfered portions need not be formed on both all the corners that form a border between the components adjacent to the surfaces 12a and 12a of the polarizing electrode 12 that do not contact the separator 11 or the collector 13, or all corners that form the border between the surface 12b of the polarizing electrode 12 contacting the collector 13 and the surfaces 12a and 12a that are not in contact with the separator 11 or the collector 13 that are adjacent to the surface 12b, and in this case, the above-described effects are increased.

In addition, projections 22 that position the polarizing electrodes 12 with respect to a gasket 14 can be formed, or they can be formed on both the gasket 14 and the polarizing electrode 12. However, forming them only on the gasket 14 is preferable due to the ease of manufacture. The number of projections 22 should be one or more, but as explained above, 4 is the optimum number.

As described in detail above, according to a first aspect of the two layer electrical capacitor of the present invention, because a chamfered portion is formed on at least one of either the corner that is the border between the components that do not contact the separator and the collector of the polarizing electrode or the corner that is the border of the surface that contacts the collector of the polarizing electrode and the surface that does not contact the separator and collector adjacent to this surface, the stress concentrated on the corner, which occurs easily at the contacting portions between the collectors and the polarizing electrodes, now occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

According to a second aspect of the electrical double layer capacitor of the. present invention, because chamfered portions are formed at corners that are borders between components that are adjacent to the surface of the gasket facing the polarizing electrode, stress focus on the corner, which occurs easily at the contacting portions between the collectors and the polarizing electrodes, now occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

According to a third aspect of the electrical double layer capacitor of the present invention, because the polarizing electrode is positioned by forming projections for positioning the polarizing electrodes with respect to the gasket on at least one of the gasket or the polarizing electrode, as a result in the case that the polarizing electrodes and the gasket are too close, the stress focus produced at the contacting portions at their borders with the collector occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

Furthermore, equalized serial resistance (ESR) caused by the applied pressure increasing irregularly when the polarizing electrodes are misaligned can be suppressed.

Furthermore, the self-discharge characteristics (SD) do not deteriorate due to the powder from the polarizing electrodes dispersing into the separator and generating a flow of current when the polarizing electrodes are misaligned with each other.

According to a fourth aspect of the electrical double layer capacitor of the present invention, because chamfered portions are formed at the corners that are borders between components adjacent to the surface of the gasket facing the polarizing electrodes, stress focus on the corner, which occurs easily at the contacting portions between the collectors and the polarizing electrodes, now occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

According to a fifth aspect of the electrical double layer capacitor of the present invention, because projections that position the polarizing electrode with respect to the gasket are formed on at least one of the gasket and the polarizing electrode, the polarizing electrode is positioned, and in the case that the polarizing electrodes and the gasket are too close, the stress focus produced at the contacting portions at their borders with the collector occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

Furthermore, equalized serial resistance (ESR) caused by the applied pressure increasing irregularly when the polarizing electrodes are misaligned can be suppressed.

Furthermore, the self-discharge characteristics (SD) do not deteriorate due to the powder from the polarizing electrodes dispersing into the separator and generating a flow of current when the polarizing electrodes are misaligned with each other.

According to a sixth aspect of the electrical double layer capacitor of the present invention, because projections that position the polarizing electrode with respect to the gasket are formed on at least one of the gasket and the polarizing electrode, the polarizing electrodes are positioned, and in the case that the polarizing electrodes are too close to the gasket, the stress focus produced at the contacting portions at their borders with the collector occurs with difficulty.

Therefore, because the occurrence of fractures in the collectors can be avoided, the defect of electrolyte solution leaking to the outside due to fractures occurring in the collector can be prevented, and both the yield during manufacture processing and the reliability can be improved.

Furthermore, equalized serial resistance (ESR) caused by the applied pressure increasing irregularly when the polarizing electrodes are misaligned can be suppressed.

Furthermore, the self-discharge characteristics (SD) do not deteriorate due to the powder from the polarizing electrodes dispersing into the separator and generating a flow of current when the polarizing electrodes are misaligned with each other.

What is claimed is:

1. An electrical double layer capacitor providing one basic cell or two or more layers of basic cells, the basic cells comprising separators, pairs of polarizing electrodes that are disposed so as to contact the respective separator on both sides thereof, a pair of collectors positioned so as to contact the surface of these polarizing electrodes opposite to those of said separators, and gaskets disposed in proximity to the polarizing electrodes, and wherein chamfered portions are formed on at least one among the corner that is a border between components adjacent to the surfaces of said polarizing electrodes that do not contact said separator or said collector, and the corner that is the border of the surface of said polarizing electrode that contacts said collector and the surface that does not contact said separator and said collector that is adjacent to said surface.

2. An electrical double layer capacitor according to claim 1 wherein chamfered portions are formed on the corners that are the border between components adjacent to the surface of said gasket that face said polarizing electrodes.

3. An electrical double layer capacitor according to claim 1 wherein projections that position said polarizing electrode with respect to said gasket are formed on at least one of said gasket and said polarizing electrodes.

4. An electrical double layer capacitor according to claim 2 wherein projections that position said polarizing electrode with respect to said gasket are formed on at least one of said gasket and said polarizing electrodes.

5. An electrical double layer capacitor providing one basic cell or two or more layers of basic cells, the basic cells comprising separators, pairs of polarizing electrodes that are disposed so as to contact the respective separator on both sides thereof, a pair of collectors positioned so as to contact the surface of these polarizing electrodes opposite to those of said separators, and a gasket disposed in proximity to the polarizing electrodes, and wherein chamfered portions are formed on the corner that is the border between components adjacent to the surface of said gasket that faces said polarizing electrodes.

6. A two layered electric capacitor according to claim 5 wherein projections that position said polarizing electrodes with respect to said gasket are formed on at least one of said gasket and said polarizing electrodes.

7. An electrical double layer capacitor providing one basic cell or two or more layers of basic cells, the basic cells comprising separators, pairs of polarizing electrodes that are disposed so as to contact the respective separator on both sides thereof, a pair of collectors positioned so as to contact the surface of these polarizing electrodes opposite to those of said separators, and a gasket disposed in proximity to the polarizing electrodes, and wherein projections that position said polarizing electrodes with respect to said gasket are formed on at least one of said gasket and said polarizing electrodes.

* * * * *